United States Patent Office 3,230,184
Patented Jan. 18, 1966

3,230,184
GLASS MICROSPHERE AND FIBER FILLED
POLYESTER RESIN COMPOSITION
Harvey E. Alford, Amherst, Ohio, assignor to The Standard Oil Company, Cleveland, Ohio, a corporation of Ohio
No Drawing. Filed Mar. 6, 1962, Ser. No. 177,730
6 Claims. (Cl. 260—2.5)

This invention relates to improved polyester resin molding compositions especially adapted for use where high strength-to-weight ratios are required in the final product. More particularly, this invention relates to a polyester resin molding composition containing as a filler a mass of hollow discrete spheres of synthetic, fused, water-insoluble alkali metal silicate-based glass.

Polyester resin molding compositions, upon shaping and curing, yield products of superior properties, including high impact and flexural strength. Such molding compositions comprise the liquid polyester resin, one or more cross-linking agents, fillers, and optionally, polymerization inhibitors, mold release agents and stabilizers. The composition is normally maintained in the liquid state until ready for use, shaped by any conventional means, including low pressure molding, casting, laminating, transfer molding and the like, and then heated to a sufficiently high temperature to cause cross-linking to take place, to form an infusible, insoluble product.

By means of this invention, polyester resin molding compositions are provided which yield products of substantially higher strength and lighter weight, and which are useful in aerodynamics applications where high strength, and light weight are prime considerations. These advantages are achieved by the use of the hollow glass spheres described in parent application Serial No. 862,436, filed December 2, 1959, as the bulk filler. This substitution not only leads to products of increased strength and lighter weight, but also leads to a decrease in the amount of the more expensive fibrous reinforcing fillers usually used to obtain a given strength.

The hollow glass spheres useful in this invention, as described in U.S. Patent No. 2,978,340 and No. 3,030,215, can be characterized as being hollow discrete spheres of synthetic, fused, water-insoluble alkali metal silicate-based glass, having solid walls of approximately the same density throughout each sphere and having clear, smooth surfaces. They may be varied in size depending upon the size of the feed particles, the amount of gas liberating agent, the temperature, etc. In general, the spheres will have a diameter within the range of 5 to 5000 microns and preferably 10 to 750 microns. Within the preferred range the average sphere diameter will usually be from about 75 to 200 microns. A typical mass of spheres for example, has particles within the size range of 10 to 350 microns with an average diameter of 100 microns.

The gas density of a mass of the spheres will vary to some extent with the density of the material from which they are formed, but to a larger extent with the ratio of the volume of the spheres to their wall thicknesses. Gas densities in the range of 0.1 to 0.75 have been achieved in accordance with the invention described in the parent application. For most purposes, lower densities are desirable and densities in the range of 0.25 to 0.45 are preferred. In the very low densities, the spheres tend to be more fragile because of the thinness of the walls. Within the preferred range, the spheres have adequate strength for most uses.

The wall thickness is very small. For instance, a sphere having a diameter of 350 microns and a gas density of 0.3 has a wall thickness of only 4 microns, which is only a little more than 1% of the diameter. In general, the wall thickness can be expressed as a percentage of the diameter of the spheres and will be about 0.5 to 10% thereof, preferably about 0.75 to 1.5% of the diameter in particles having a diameter of 10 to 500 microns.

As disclosed in the parent application, the hollow spheres used in the composition of this invention can be made from an alkali metal silicate which has the formula $(Me_2O)_x(SiO_2)_y$. Various alkali metal silicates within the range where $x$ is 1, $y$ is 0.5 to 5 and Me is an alkali metal such as sodium, potassium, or lithium, have been found satisfactory. One alkali or a mixture of several alkali metals can make up the alkali metal portion. Sodium silicate is the preferred material since it is a low cost raw material readily available from various commercial sources in sufficient purity and uniformity from batch to batch. A typical example of a commercial sodium silicate which can be used in the process has the formula $Na_2O.(SiO_2)_{3.22}$. The alkali metal silicate will be referred to hereinafter as the basic feed material in the process. It is convenient to use it initially as an aqueous solution or slurry having a silicate content of 35 to 50 percent. The amount of water present is not critical since it is subsequently removed.

A silicate insolubilizing agent must be added to the basic feed material. Such insolubilizing agents render the hollow spheres more resistant to moisture. This agent can be selected from among the oxides of metals and metalloids, such as the oxides of zinc, aluminum, calcium, iron, boron, magnesium, or lead. Such oxide or oxides may be added directly to the feed material, or compounds which will readily decompose under heat to yield the desired oxide may be incorporated with the feed material. The latter method can be accomplished by the addition of such metal salts as carbonates or bicarbonates, i.e., calcium carbonate or bicarbonate, nitrates, halides, sulfates, hydroxides, such as aluminum hydroxide. The metal component can also be in the negative radical, such as in borates such as borax, and aluminates, such as potassium aluminate. In such case, the alkali metal in the silicate may be correspondingly reduced. The use of such oxides or oxide-forming compounds is well known in the glass and ceramics industry, and any standard text in this field explains their function and the properties they impart in forming a water-insoluble glass-like composition upon fusion of the same with an alkali metal silicate. The amount of silicate insolubilizing agent may vary, depending on its composition and the degree of water desensitization required. The above texts explain this. Generally, the amount used will be from about 0.5 to 10% based on a 40% solution of sodium silicate. Boric acid and boric oxide are the preferred silicate insolubilizing agents in that they also appear to have the effect of lowering the required fusion temperature.

The composition containing the silicate and the insolubilizing agent should be so selected as to ingredients and proportions as to give a molten glass mixture having a high viscosity at a fairly low fusion temperature and a high surface tension. The word "glass" as used herein with reference to composition is intended to refer to the fusion product of an alkali metal silicate with an oxide, said product having an amorphous form, being insoluble in water and otherwise having the known properties of glass although not necessarily being transparent. The silicate and the oxide are referred to herein as glass-forming ingredients.

In order to achieve spheres of very low density, it is necessary to add to the composition a compound or compounds which will liberate a gas at about the fusion temperature of the glass-forming composition. If the gas is liberated at too low a temperature, it is likely to be dissipated or become otherwise unavailable at the time when the particles fuse with the result that the particles will remain solid. On the other hand, if the gas is not liberated at or prior to the fusion temperature, the particles will also remain solid. The amount of gas liberating agent employed need not be large, generally from 0.1 to 5% by weight based upon the weight of the glass-forming ingredients can be used. An amount of 0.5 to 2% is usually preferred, depending upon the amount of gas capable of being liberated. Unduly large amounts of gas are to be avoided since they cause the expanding particles to burst with resultant collapse and fusion in the solid state. There are a large number of liquid and solid substances which can be used as gas liberating agents.

Typical of these substances are salts selected from the group consisting of carbonates, nitrates, nitrites, azides, carbamates, oxalates, formates, benzoates, sulfates, sulfites, and bicarbonates such as sodium bicarbonate, sodium carbonate, ammonium carbonate, sodium nitrate, sodium nitrite, ammonium chloride, ammonium carbamate, ammonium bicarbonate, sodium sulfite, calcium oxalate, magnesium oxalate, sodium formate, ammonium benzoate, ammonium nitrite, zinc sulfate, zinc carbonate, aluminum sulfate, and aluminum nitrate. Typical of organic compounds are urea, dimethylol urea, biuret, melamine, trinitrotoluene, mellitic acid, glycerin, aniline p-sulfonic acid, trimethyl glycine, adipic acid, aminoquinoline, nitroaminobenzoic acid, nitrobenzonitrile, 5-methyl-resorcinol, pentaglycerol, pyridine dicarboxylic acid, thiophene carboxylic acid, tetrabromoaniline, trihydroxyanthroquinone, and Carbowax 1000.

The three components of the feed composition can be intimately mixed by any known procedure and subdivided into small particles. For example, the three components can be suspended or dissolved in a suitable liquid, and thereafter thoroughly mixed, and after removal of the liquid, as by evaporation, ground, and if necessary, classified. The feed particle diameter can range in size from about five up to about 2500 microns, although for economic reasons particles of a diameter not exceeding 500 microns ordinarily would be used. The economic limits of feed particle size depend largely upon the flexibility or range of operating conditions of the furnace used in the process. For any one particular batch it will be highly advantageous to use a feed of as narrow a particle size range that can economically be obtained. Otherwise, widely varying sizes of particles will require such highly different heat requirements for conversion to hollow spheres that it will be much more difficult to find optimum operating conditions for the furnace. By use of a narrow range of feed particle sizes, a more uniform product can be obtained in higher yields. The specific particle size range to be used also will be determined in part by the ultimate properties desired.

It is preferred to introduce the particulate mixture comprising the basic feed material, the gas liberating agent, and the silicate-insolubilizing agent as a dry or substantially dry material which need not be completely anhydrous, in a heated zone where the particles can be suspended in a hot gas stream and there be caused to fuse and expand. Many types of equipment can be used in this stage including the furnace disclosed in Patent No. 2,978,339 which is based upon an application filed of even date with the application upon which Patent No. 2,978,340 issued. This furnace utilizes an updraft principle where the feed particles are introduced at or near the bottom of the furnace in an ascending column of hot gases. In such a furnace the particle settling rate in the gas is a balance of the buoyancy exerted on the particle by the upward velocity of the gas against the particle mass and volume or density. In this manner the particle receives heat in direct relationship to the requirements of heat necessary to fuse and expand it to a hollow sphere. This furnace permits the economical use of a feed of somewhat wider particle size range than might otherwise be the case.

The main process variables for a furnace of this type are temperature and particle residence time. The temperature is selected in accordance with the fusion temperature of the feed mixture. This temperature must be sufficiently high to melt the solid particles but be maintained as low as possible to minimize costs and to facilitate process control. Temperatures within the range of 1000° to 2500° F. can be used, depending on the feed employed and residence time.

The particle residence time in the furnace becomes primarily a function of feed particle size and the total flow of gases through the furnace. Accordingly, the residence time for any given size apparatus may be adjusted to an optimum for the particular feed mixture and particle size range by varying the total flow of gases through the furnace. The operating conditions are adjusted so that the feed particles remain suspended in the hot region of the furnace for a time adequate to fuse and expand the particles to hollow spheres and are then carried upward in the ascending column of hot gases out of the high temperature zone at the furnace into levels of progressively lower temperatures so that the outer skin has time to substantially solidify without danger of rupture during product collection. The particles move out with the stream of gases into the cooler regions of the furnace to be collected either at the bottom of a chamber which surrounds the high temperature zone of the furnace, or the particles may remain in the ascending gases and pass overhead from the cooling zone into a separating zone where the particles are separated from the gases and collected. Residence times of 0.5 to 10 seconds are generally employed.

As indicated, the material entering the furnace is usually relatively dry. Generally it should not contain more than 20% by weight of moisture. Preferably it should contain about 3% or less of moisture by weight. The higher the water content, the greater the heat requirements in the fusing step. In addition, a lower moisture content will usually result in more satisfactory hollow spheres. The material can be dried by conventional methods, as for example, by heating in an air oven at a temperature well below its fusion temperature prior to introduction to the furnace.

EXAMPLE A

This example represents the method of producing the hollow spheres which are thereafter to be used in the composition of this invention. The feed composition was made by forming a slurry of a sodium silicate solution containing 40% sodium silicate $Na_2O \cdot (SiO_2)_{3.22}$ to which had been added 5.6% boric acid and 1% urea, based on the weight of the sodium silicate solution. The slurry was stirred until uniform and spread out in pans one inch thick and dried in an oven at a temperature of 580° F. for 16 hours. The dried material which had a moisture content of 3% was ground and classified by screening. All particles having a diameter of less than 250 microns were retained as feed material. These particles had an average diameter of 60 microns.

The feed material was fed into a vertical tubular furnace having an updraft flow of the type described above at a rate of 2 pounds per hour in a furnace having a diameter of 10 inches and a height of 32 inches. The temperature within the furnace was 2000° F. and the average residence time of the particles was 2 seconds.

The particles were collected after their exit from the top of the furnace and were found to vary in size from 10 to 350 microns with an average diameter of 100 microns and a gas density of 0.30 gram/ml. The walls of the particles were clear and transparent and free from bubbles. All of the particles were hollow and uniform in appearance and varied only as to size within the above range.

The polyesters applicable for use in conjunction with the hollow glass sphere fillers are of the type known to the art. Generally, they may be described as the polycondensation products of dibasic acids with dihydric alcohols. The polyesters used in molding compositions of the type contemplated by this invention are of the unsaturated type which are produced when either or both of the dibasic acid and the dihydric alcohol reactants contain non-aromatic unsaturation. Conventionally, the unsaturation is introduced by the use of unsaturated dibasic acids, such as, for example, maleic or fumaric acids. As a result of this non-aromatic unsaturation, they can be cross-linked or copolymerized with another unsaturated, copolymerizable monomer.

In the preparation of the unsaturated polyesters, it is generally the practice to conduct the esterification step under conditions that will substantially prevent any tendency toward polymerization across the double bonds. This is generally accomplished by controlling the temperature of the esterification and the use of inhibitors of addition polymerization.

Oxygen is generally excluded from the reaction system in order to permit the reaction to proceed for enough time to yield a resin of low acid number and low viscosity. Generally, the reaction is carried out in an atmosphere of an inert gas such as nitrogen or carbon dioxide.

The most common acids employed in the manufacture of polyester resins are maleic and fumaric acids. In general, any unsaturated dicarboxylic acids containing non-aromatic unsaturation can be employed including citraconic acid, itaconic acid, glutaconic acid, alpha-hydromuconic acid, 2-octenedioic acid, 4-amyl-2,5-heptadienedioic acid, 3-hexynedioic acid, 3-hexene-2,2,3,4-tetracarboxylic acid, endomethylene tetrahydrophthalic acid and hexachloroendomethylene tetrahydrophthalic acid. Alternately, acid anhydrides, such as maleic anhydride, may be used in place of the acids.

It is sometimes desirable to reduce the amount of unsaturation present in the polyester in order to reduce the degree of cross-linking of the final product. This is generally done by mixing the unsaturated acid with a quantity of a saturated dibasic acid or acid anhydride. The exact proportions of saturated to unsaturated acid will depend upon the properties desired in the final product. Generally, from about 10% to about 50% of the total amount of acids employed in the esterification reaction can be saturated. The saturated acids most commonly employed in conjunction with the unsaturated acids in the formation of polyester resins are phthalic and adipic acids or anhydrides, but other saturated dicarboxylic acids or anhydrides, aliphatic or aromatic, including malonic, succinic, glutaric, pimelic, and terephthalic acids and anhydrides can be employed.

The alcohol component will generally be saturated, and preferably will be a glycol, such as ethylene glycol, propylene glycol, diethylene glycol, dipropylene glycol and tetramethylene glycol. Higher molecular weight glycols can also be employed, such as decamethylene glycol.

If desired, unsaturated alcohols can be used, including 2,5-dimethyl-3-hexyne-2,5 diol; 3,6-dimethyl-4-octyne-3,6-diol; and 2 butene-1,4-diol. After the esterification reaction takes place, the unsaturated polyesters are generally mixed with a monomeric copolymerizable compound. The temperature and the reactivity of both the polyester and the cross-linking agent as well as the amount of cross-linking agent will determine the speed of the cross-linking reaction. Generally, from about 20 to about 40 parts by weight of cross-linking agent are employed per hundred parts by weight of polyester. Representative cross-linking agents include styrene, divinyl benzene, 2-methyl styrene, chloro-and fluorostyrenes, vinyl toluene, diallyl phthalate, methyl methacrylate, triallyl cyanurate, allyl diglycolate, diallyl phenyl phosphonate, diethylene glycol-bis-(allyl carbonate), 1,2 propylene glycol-bis-(allyl carbonate), allyl carbonate and methallyl maleate. Of these cross-linking agents, styrene and diallyl phthalate are usually used. The choice of cross-linking agents selected will depend upon the use. Styrene or methyl methacrylate are generally employed where rapid cross-linking is desired. Diallyl phthalate is employed where slower curing properties are required, and is more often employed where it is intended to store the resin composition in the uncured state for relatively long periods of time. Allyl diglycolate tends to yield transparent final products.

Where desired, a catalyst, also known as an accelerator or promoter can be added to the polyester prior to the fabrication step. The usual catalysts are the organic peroxides such as, for example, benzoyl peroxide and dicumyl peroxide. In order to increase the storage life of the mixture containing the cross-linking agent, various room temperature stabilizers are often employed. These stabilizers, in effect, raise the temperature required for the cross-linking reaction to take place. The most common of the stabilizers are the salts of substituted hydrazines, the quaternary ammonium salts and the substituted parabenzoquinones.

Optionally, mold release agents can be added to the composition either before or after the addition of cross-linking agents. There are generally four types of such mold release agents, the film type such as polyvinyl alcohol and cellophane, film forming agents, including the alginates methyl cellulose and polyvinyl alcohol salts, waxes such as carnauba wax and lubricants such as graphite, sulfate esters, alkyl phosphates and silicones.

Fillers can be added to the composition either before or after the addition of cross-linking agents. There are two types of fillers, both of which are generally present in a polyester resin molding composition. The fibrous reinforcing type of filler is usually incorporated in the polyester resin composition in order to improve the impact and flexural strength of the final product. These fibrous reinforcing fillers also tend to improve temperature resistance and electrical properties. Fibers such as glass, quartz, cotton, nylon, asbestos, ramie and sisal are generally employed. The length of the fibers should be more than about one quarter inch. Generally, from about one to about thirty-five parts by weight of fibrous reinforcing fillers should be employed per hundred parts by weight of polyester resin composition.

In addition to the fibrous fillers, bulk fillers are present. The bulk fillers serve to decrease the cost of the final product, give better flowing characteristics, give it enough consistency and provide a smoother surface on the final product. In addition, they absorb some of the heat of the curing reaction, and also lessen internal strains and settling effects due to the extreme viscosity changes which might cause a more porous surface. The bulk fillers also tend to reduce thermal expansion and shrinkage. The bulk fillers heretofore employed have been, for the most part, carbonates and clays. Metal silicates have also been employed to a somewhat lesser extent. Generally, from about ten to about sixty parts by weight of bulk filler per hundred parts by weight of resin composition are included in conventional molding compositions.

Additional details on conventional polyester resin compositions and methods of making them can be found in Bjorksten et al., Polyesters and Their Applications (Reinhold, 1956).

In this invention, the hollow glass spheres replace all or part of the bulk fillers conventionally employed. Although there is no critical maximum amount of hollow sphere fillers, more than about 500 parts by volume per 100 parts by volume of polyester resin molding composition is not usually required, since the improvement in properties obtained are not commensurate with the additional cost. Optimum strength properties are generally obtained using from about 50 to 300 parts of hollow sphere fillers per 100 parts by volume of polyester resin molding composition. As little as one percent by volume of hollow glass spheres is sufficient to show improved results.

The hollow sphere fillers are added to the molding composition by conventional means, either before or after, but generally after, the addition of cross-linking agents and fibrous reinforcing fillers.

The following examples, in the opinion of the inventors, represent the best mode of carrying out their invention.

EXAMPLES 1–7

A series of polyester resin molding compositions were prepared, using as the polyester resin, a commercial product containing the reaction product of equimolar quantities of maleic acid and phthalic anhydride with propylene glycol, having an acid number of 6–10, dispersed in diallyl phthalate, the weight ratio of diallyl phthalate to linear polyester resins being one to three. The compositions, which were viscous liquids at room temperature, also contained five parts by weight of one-half inch cut glass fibers per 100 parts by weight of polyester resin-diallyl phthalate mixture as the fibrous reinforcing filler. Varying amounts of hollow glass spheres produced in accordance with Example A were then added to each composition as the bulk filler, as indicated in Table I. Each composition was then poured into a mold having a cavity 6 inches by 6 inches by ½ inch, and molded under a pressure of 50 p.s.i. at a temperature of 190° F. for 15 minutes. Physical tests were performed on the molded products to determine density, compressive strength, modulus of elasticity in compression, modulus of elasticity in flexure, impact strength and water absorption over prolonged periods. Tests results are recorded in Table I.

EXAMPLES 8 to 12

These examples show the effect of varying the amount of fibrous reinforcing filler added to a polyester resin composition containing a given volume of hollow glass spheres as fillers. A polyester of the types used in Examples 1 to 7 was filled with 60% by volume of hollow glass spheres, produced in accordance with Example A, and then divided into five parts, to each of which was added an amount of one-half inch cut glass fibers, as noted in Table II. Cured products were obtained as in Examples 1 to 7, and tested for density, flexural strength and modulus of elasticity in flexure. The data obtained is recorded in Table II.

*Table II*

| Example | ½-inch Cut Glass Fibers | | Density (g./cc.) | Flexural Strength (p.s.i.) | Modulus of Elasticity in Flexure (p.s.i.×10⁶) |
|---|---|---|---|---|---|
| | Weight Percent | Volume Percent | | | |
| 8 | 3.2 | 1.0 | 0.71 | 1,860 | 0.275 |
| 9 | 6.3 | 2.0 | 0.89 | 3,010 | 0.488 |
| 10 | 11.8 | 3.8 | 0.96 | 6,930 | 5.67 |
| 11 | 16.7 | 5.7 | 1.03 | 9,980 | 7.34 |
| 12 | 29.6 | 11.7 | 1.19 | 16,200 | 9.61 |

These examples illustrate the exceptionally high strength and low density products attainable from polyester resin molding compositions in accordance with this invention.

CONTROL

To more clearly point out the advantage obtained through use of the present invention, a series of polyester compositions were prepared as a control using the procedure of Examples 8 to 12 except that in place of the hollow glass spheres, a commercial filler grade of calcium carbonate was used as the bulk filler. The data obtained from these control runs are tabulated in Table III.

The results of the control clearly illustrate that higher strength products are obtained by means of this invention. At equivalent bulk filler volumes, the hollow sphere filled polyester products required only 11.7% by volume (based

*Table I*

| Example | Hollow Glass Sphere Filler | | Density g./cc. | Compressive Strength, p.s.i. | Modulus of Elasticity in Compression p.s.i.×10⁵ | Modulus of Elasticity in Flexure p.s.i.×10⁵ | Impact Strength ft. lb. per inch of notch* | Water Absorbed | | |
|---|---|---|---|---|---|---|---|---|---|---|
| | Wt. Percent of Total Composition | Volume Percent of Total Composition | | | | | | Wt. Percent after 2 hours | Wt. Percent after 14 hours | Wt. Percent after 24 hours |
| 1 | 1.7 | 5.4 | 1.26 | 4,560 | 1.35 | 2.63 | 15.13 | 0.77 | 5.00 | 6.30 |
| 2 | 3.4 | 10.6 | 1.19 | 4,020 | 1.12 | 2.45 | 15.20 | | | |
| 3 | 7.3 | 21.1 | 1.15 | 5,240 | 1.60 | 2.75 | 16.05 | 0.57 | 4.81 | 5.53 |
| 4 | 11.9 | 31.4 | 1.07 | 5,470 | 1.89 | | 16.20 | | | |
| 5 | 17.4 | 41.7 | 1.02 | 7,100 | 2.68 | 3.02 | 15.28 | 0.52 | 4.59 | 4.68 |
| 6 | 32.1 | 61.6 | 0.71 | 3,090 | 1.68 | 2.75 | 9.45 | 1.82 | 10.40 | 7.38 |
| 7 | 55.7 | 81.0 | 0.59 | 1,200 | 0.96 | 2.22 | 10.51 | 12.31 | 22.50 | 13.28 |

*Izod Impact Test (ASTM D 256-54T).

The data in Table I show the effectiveness as a filler of the hollow glass spheres. Not only do they act as a filler in reducing the amount of resin required in the molding composition, but they also decrease the density of the final product, and while doing so also increase its strength. Molded products of low density and high strength are most desirable for many applications. An indication of the magnitude of the effect of the hollow glass sphere fillers may be noted from Example 5, wherein a composition containing 41.7 volume percent of hollow glass sphere filler exhibits a very high compressive strength and modulus of elasticity in compression, as well as other outstanding properties, but with all of the improvement in strength, displays a density of only 1.02 g./cc., considerably less than that of conventional polyester resin-based products.

on the total volume of polyester resin and hollow glass spheres) of cut glass fibers to achieve a flexural strength level in excess of 16,000 p.s.i. By contrast, the conventional calcium carbonate filled product required 16.4% by volume of cut glass fibers to achieve a comparable strength value. Thus, the use of hollow glass spheres as the bulk filler permitted a forty percent reduction in the volume of cut glass fibers required. In addition, the density of the product containing the hollow glass spheres was some thirty-five percent lower than that of the conventionally filled product, a factor of prime importance for many applications requiring high strength-low weight materials. The superiority of the hollow glass sphere filled products in terms of their increased moduli of elasticity in flexure is easily apparent.

The superiority of the products of this invention is observed at lower reinforcing filler levels as well as can be seen from Tables II and III.

*Table III*

| Control Sample | ½-inch cut Glass Fibers, Volume Percent | Density (g./cc.) | Flexural Strength (p.s.i.) | Modulus of Elasticity in Flexure (p.s.i.×10⁶) |
|---|---|---|---|---|
| C-1 | 3.4 | 1.63 | 4,400 | |
| C-2 | 6.3 | 2.09 | 9,090 | 1.61 |
| C-3 | 10.5 | 2.07 | 12,400 | 1.54 |
| C-4 | 16.4 | 1.88 | 16,000 | 1.3 |

I claim:

1. A polyester molding composition comprising an ethylenically unsaturated polyester molding resin, and, as a filler, fibrous material and hollow discrete spheres of synthetic, fused, water-insoluble alkali metal silicate-based glass, said hollow spheres having solid walls of the same density throughout, and clear, smooth surfaces, diameters of from 5 to 5,000 microns and wall thicknesses of from 0.5 to 10% of their diameters, a mass of said spheres having a gas density of 0.1 to 0.75 gm./ml.

2. The composition of claim 1 wherein the fibrous material is cut glass fibers and the said hollow discrete spheres are characterized as having diameters of from 10 to 500 microns, an average diameter of from 75 to 150 microns, an average wall thickness of about 0.75% to 1.5% of their diameters, a mass of said spheres having a gas density of 0.25 to 0.45 gm./ml.

3. A method of obtaining low density, high strength molded polyester resin products comprising incorporating with an ethylenically unsaturated polyester molding resin, as a filler, fibrous material and hollow discrete spheres of synthetic, fused, water-insoluble alkali metal silicate-based glass, said hollow spheres having solid walls of the same density throughout, and clear, smooth surfaces, diameters of from 5 to 5,000 microns and wall thicknesses of from 0.5 to 10% of their diameters, a mass of said spheres having a gas density of 0.1 to 0.75 gm./ml., and molding the resulting composition to form a low density high strength molded product.

4. A method as in claim 3 wherein the fibrous material is cut glass fibers and the said hollow spheres are characterized as having diameters of from 10 to 500 microns, an average diameter of from 75 to 150 microns, an average wall thickness of about 0.75% to 1.5% of their diameters, a mass of said spheres having a gas density of 0.25 to 0.45 gm./ml.

5. A shaped, solid, cross-linked ethylenically unsaturated polyester resin composition having incorporated therewith, as a filler, fibrous material and hollow discrete spheres of synthetic, fused, water-insoluble alkali metal silicate-based glass, said hollow spheres having solid walls of the same density throughout, and clear, smooth surfaces, diameters of from 5 to 5,000 microns and wall thicknesses of from 0.5 to 10% of their diameters, a mass of said spheres having a gas density of 0.1 to 0.75 gm./ml.

6. The composition of claim 5 wherein the fibrous material is cut glass fibers and the said hollow discrete spheres are characterized as having diameters of from 10 to 500 microns, an average diameter of from 75 to 150 microns, an average wall thickness of about 0.75% to 1.5% of their diameters, a mass of said spheres having a gas density of 0.25 to 0.45 gm./ml.

References Cited by the Examiner

UNITED STATES PATENTS

| 2,676,892 | 4/1954 | McLaughlin | 106—40 XR |
| 2,797,201 | 6/1957 | Veatch et al. | 106—40 |
| 2,978,340 | 4/1961 | Veatch et al. | 106—40 |
| 3,030,215 | 4/1962 | Veatch et al. | 106—40 |

OTHER REFERENCES

Bjorksten: "Polyesters and Their Applications," Reinhold.

MORRIS LIEBMAN, *Primary Examiner.*